(12) United States Patent
Fujise (10) Patent No.: US 11,595,555 B2
(45) Date of Patent: Feb. 28, 2023

(54) SENSOR MODULE

(71) Applicant: CANON KABUSHIKI KAISHA, Tokyo (JP)

(72) Inventor: Yoshihiko Fujise, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/704,854

(22) Filed: Mar. 25, 2022

(65) Prior Publication Data

US 2022/0321745 A1    Oct. 6, 2022

(30) Foreign Application Priority Data

Mar. 31, 2021   (JP) .............................. JP2021-061119

(51) Int. Cl.
*H04N 5/225*    (2006.01)
*H04N 5/232*    (2006.01)

(52) U.S. Cl.
CPC ......... *H04N 5/2253* (2013.01); *H04N 5/2328* (2013.01); *H04N 5/23258* (2013.01)

(58) Field of Classification Search
None
See application file for complete search history.

(56) References Cited

U.S. PATENT DOCUMENTS

| | | | | |
|---|---|---|---|---|
| 8,227,879 | B2* | 7/2012 | Eskridge | G01P 15/18 257/417 |
| 2006/0227221 | A1* | 10/2006 | Okubo | H04N 5/23267 348/E5.046 |
| 2008/0115562 | A1* | 5/2008 | Haino | H04N 5/23248 73/1.37 |
| 2014/0318245 | A1* | 10/2014 | Perego | B62J 45/414 73/510 |
| 2021/0203849 | A1* | 7/2021 | Imaizumi | H04N 5/23258 |

FOREIGN PATENT DOCUMENTS

JP    2013044645 A    3/2013

* cited by examiner

*Primary Examiner* — Cynthia Segura
(74) *Attorney, Agent, or Firm* — Canon U.S.A., Inc. IP Division (57) ABSTRACT

A sensor module includes a base member and a sensor, wherein the base member is a molded component on which pattern wiring is directly formed, wherein the base member includes at least a principal surface, a first side wall orthogonal to the principal surface, and a second side wall orthogonal to the principal surface and the first side wall, and wherein a larger one of a width of the first side wall and a width of the second side wall in a first direction perpendicular to the principal surface is larger than a width of the principal surface in the first direction.

10 Claims, 10 Drawing Sheets

SENSOR MODULE

BACKGROUND

Field

The present disclosure relates to a sensor module, and particularly to a sensor module using molded interconnect device (MID) technology.

Description of the Related Art

In recent years, electronic devices, such as cameras and smartphones, and transportation devices, such as automobiles, have incorporated sensor modules that are modularized by various sensors mounted thereon.

There are some known sensor modules to which molded interconnect device (MID) technology is applied.

The MID technology is a technique for irradiating a required portion of a base member with a laser and forming a metal plating film only on the irradiated portion. The portion on which the metal plating film is formed serves as a conductive pattern.

For example, Japanese Patent Application Laid-Open No. 2013-44645 discusses an MID package in which a gyroscope element is mounted on each of three inclined surfaces of an approximately triangular pyramid shaped body formed by a first pyramidal surface, a second pyramidal surface, and a third pyramidal surface that are orthogonal to each other.

In recent years, miniaturization of electronic devices has been in increasing demand. Along with the demand, it is desired to realize a small sensor module that can be easily housed in a miniaturized electronic device.

According to the conventional technique discussed in the above-described Japanese Patent Application Laid-Open No. 2013-44645, the MID package has large length, width, and thickness that has hindered the miniaturization of the device.

In addition, when the MID package is housed in the electronic device, the triangular pyramid shape tends to create a dead space inside the electronic device and thus is not a desirable shape for use in the electronic device.

SUMMARY

The present disclosure is directed to the provision of a small-sized sensor module that has a shape suitable for being housed in an electronic device.

According to an aspect of the present disclosure, a sensor module includes a base member and a sensor, wherein the base member is a molded component on which pattern wiring is directly formed, wherein the base member includes at least a principal surface, a first side wall orthogonal to the principal surface, and a second side wall orthogonal to the principal surface and the first side wall, wherein the principal surface is a surface having a largest area among the principal surface, the first side wall, and the second side wall, wherein the sensor includes at least a first sensor, a second sensor, and a third sensor configured to detect respective physical quantities in three directions orthogonal to each other, wherein the pattern wiring is electrically connected to each of the first sensor, the second sensor, and the third sensor, wherein the first sensor is mounted on a land formed by the pattern wiring on the principal surface, wherein the second sensor is mounted on a land formed by the pattern wiring on the first side wall, wherein the third sensor is mounted on a land formed by the pattern wiring on the second side wall, and wherein a larger one of a width of the first side wall and a width of the second side wall in a first direction perpendicular to the principal surface is larger than a width of the principal surface in the first direction.

Further features of the present disclosure will become apparent from the following description of exemplary embodiments with reference to the attached drawings.

DESCRIPTION OF THE EMBODIMENTS

Exemplary embodiments of the present disclosure will be described in detail below with reference to the attached drawings.

A molded interconnect device (MID) represents a resin injection molded component on which wiring and electrodes are directly formed.

A first exemplary embodiment of the present disclosure will be described below with reference to FIGS. 1 to 6F.

Block Diagram Illustrating Configuration Example of Digital Camera 100

Figure 1:
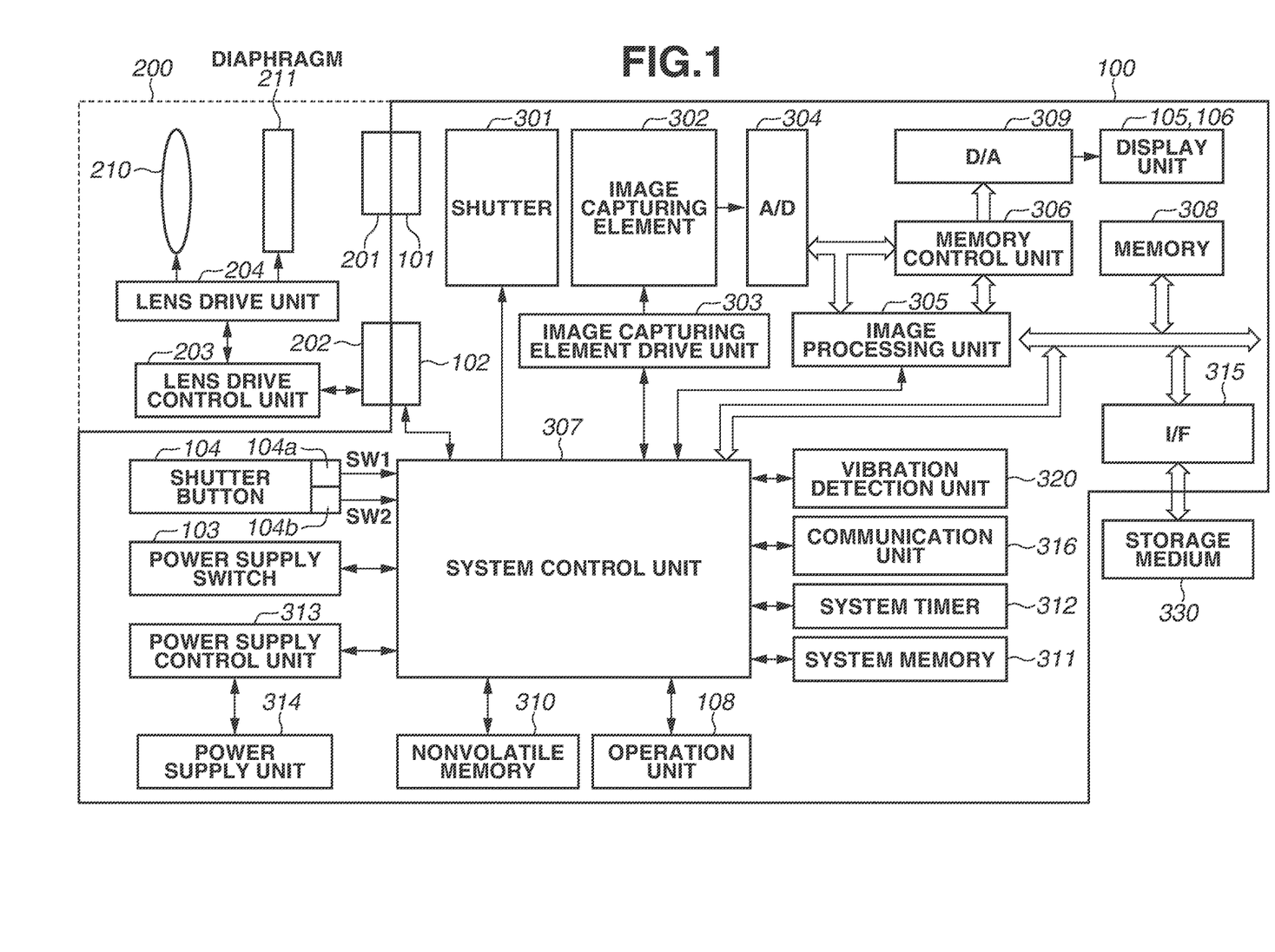
FIG. 1 is a block diagram illustrating a configuration of a camera according to a first exemplary embodiment of the present disclosure.

FIG. 1 is a block diagram illustrating a configuration example of a digital camera (hereinbelow, a camera) 100 according to the present exemplary embodiment. The camera 100 is a lens interchangeable type camera onto which a lens unit 200 can be attached to and detached from.

Figure 2A:
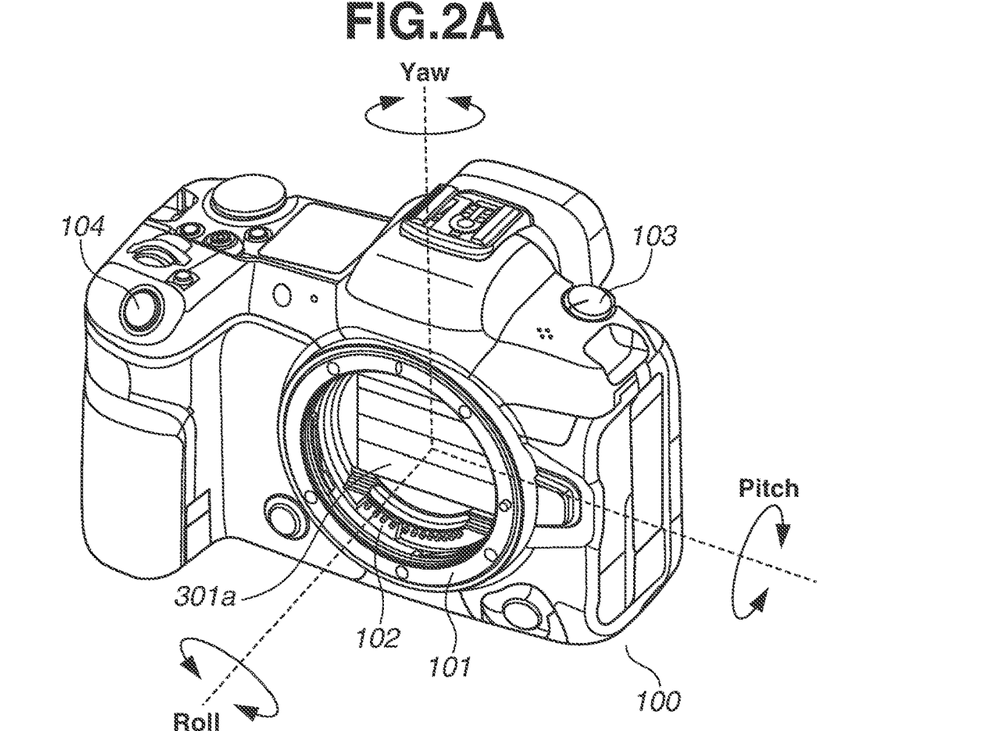
FIGS. 2A and 2B are external perspective views of the camera according to the first exemplary embodiment of the present disclosure.
Figure 2B:
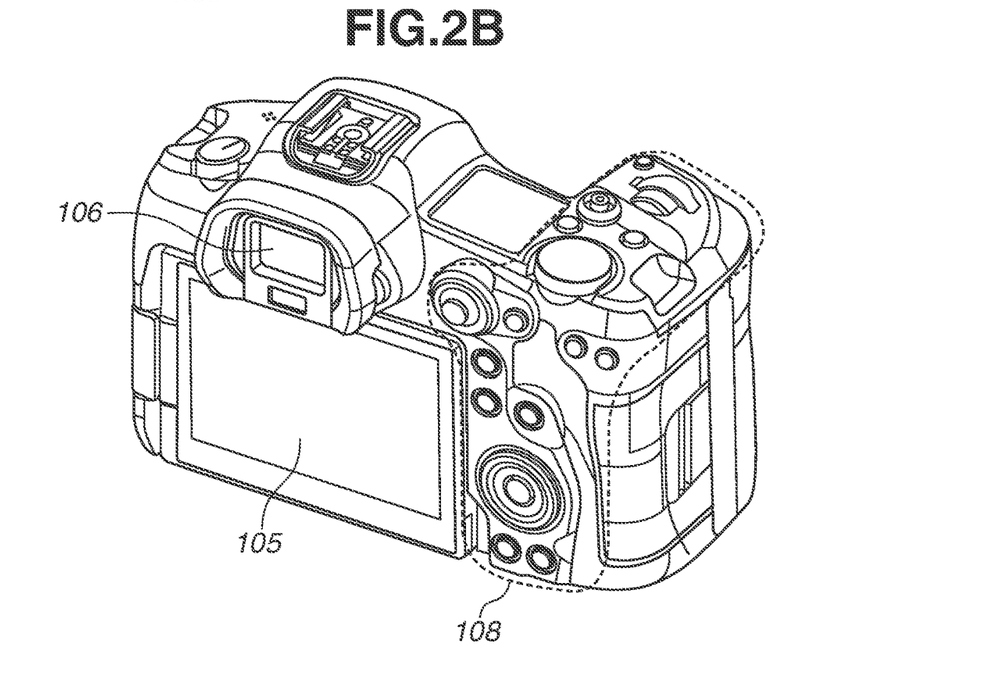

FIGS. 2A and 2B are external perspective views of the camera 100.

The lens unit 200 illustrated in FIG. 1 is fixed to the camera 100 by a lens mount 201 provided in the lens unit 200 and a lens mount 101 provided in the camera 100.

The lens unit 200 and the camera 100 are configured to be communicable with each other via a connector 202 provided in the lens unit 200 and a connector 102 provided in the camera 100.

Specifically, a system control unit 307 and a lens drive control unit 203 communicate with each other, the lens drive control unit 203 controls a lens drive unit 204 based on a signal from the system control unit 307, and the lens drive unit 204 drives a diaphragm 211 and a lens 210.

The lens 210 forms an optical image of an object on an image capturing element 302.

A shutter 301 is arranged between the image capturing element 302 and the lens 210 and blocks light from the lens 210 to the image capturing element 302 in a non-image capturing state.

At a time of capturing an image, the shutter 301 is opened based on control by the system control unit 307 so that the lens 210 can form an optical image on the image capturing element 302.

The image capturing element 302 is configured with a charge coupled device (CCD) element, a complementary metal oxide semiconductor (CMOS) element, or the like that converts the optical image into an electrical signal.

An analog-to-digital (A/D) converter 304 converts an analog signal into a digital signal. The A/D converter 304 is used to convert an analog signal output from the image capturing element 302 into a digital signal.

An image processing unit 305 performs predetermined pixel interpolation, resizing processing such as reduction, and color conversion processing on data from the A/D converter 304 or data from a memory control unit 306.

The image processing unit 305 also performs predetermined calculation processing using captured image data, and the system control unit 307 performs exposure control and range finding control based on an obtained calculation result.

Accordingly, automatic focus (AF) processing, automatic exposure (AE) processing, and flash preliminary light emission (EF) processing are performed using a through the lens (TTL) method.

The image processing unit 305 further performs predetermined calculation processing using the captured image data and performs TTL automatic white balance (AWB) processing based on a obtained calculation result.

The data output from the A/D converter 304 is directly written to a memory 308 via the image processing unit 305 and the memory control unit 306, or via the memory control unit 306.

The memory 308 stores the image data that is converted into digital data by the A/D converter 304 and is to be displayed on a display unit 105 or a display unit 106.

The memory 308 also functions as a memory (a video memory) for displaying an image.

A digital-to-analog (D/A) converter 309 converts data for image display stored in the memory 308 into an analog signal and supplies the analog signal to the display unit 105 or 106.

The image data for display written into the memory 308 is displayed by the display unit 105 or 106 via the D/A converter 309.

The display units 105 and 106 perform display corresponding to the analog signal from the D/A converter 309 on a display device such as a liquid crystal display (LCD).

Digital signals once subjected to A/D conversion by the A/D converter 304 and stored in the memory 308 are subjected to analog conversion by the D/A converter 309.

Then, the analog signals are sequentially transferred to and displayed on the display unit 105 or 106, and thus through-the-lens image display (live view display) can be performed.

A nonvolatile memory 310 is a memory as an electrically erasable and recordable storage medium, and, for example, an electrically erasable and programmable read only memory (EEPROM) is used.

The nonvolatile memory 310 stores a constant, a program, and the like that are used for an operation of the system control unit 307.

The system control unit 307 is a control unit including at least one processor and controls the entire camera 100 and the lens unit 200.

A random access memory (RAM) is used for a system memory 311. A constant and a variable used for an operation of the system control unit 307 and a program read from the nonvolatile memory 310 are loaded into the system memory 311.

The system control unit 307 performs display control by controlling the memory 308, the D/A converter 309, and the display units 105 and 106.

A system timer 312 is a time measurement unit that measures time used for various types of control and time of a built-in clock.

A first shutter switch 104a is turned ON in the middle of an operation on a shutter button 104 provided on the camera 100, i.e., by half pressing the shutter button 104 (an image capturing preparation instruction), and generates a first shutter switch signal SW1.

The system control unit 307 starts operations of the AF processing, the AE processing, the AWB processing, and the EF processing based on the first shutter switch signal SW1.

A second shutter switch 104b is turned ON by completion of the operation on the shutter button 104, i.e., by full pressing on the shutter button 104 (an image capturing instruction) and generates a second shutter switch signal SW2.

The system control unit 307 causes the shutter 301 to drive a shutter blade 301a based on the second shutter switch signal SW2.

Then, the system control unit 307 starts a series of operations of image capturing processing from reading a signal from the image capturing element 302 to writing image data to a storage medium 330.

The shutter blade 301a operates at high speed inside the shutter 301 in a direction perpendicular to an optical axis of the lens 210 and stops the operation immediately when colliding a stopper member (not illustrated) inside the shutter 301.

If a user performs an operation of selecting various function icons displayed on the display units 105 and 106, each operation member of an operation unit 108 is assigned a function appropriately for each scene and acts as various function buttons.

The function buttons include, for example, an end button, a return button, an image forward button, a jump button, a narrowing-down button, and an attribute change button.

For example, if a menu button is pressed, a menu screen on which various types of setting can be performed is displayed on the display unit 105 or 106.

The power supply is turned ON and OFF by a power supply switch 103.

A power supply control unit 313 includes a battery detection circuit, a direct current to direct current (DC-DC) converter, a switch circuit for switching a block to be energized, and the like and detects whether a battery is installed, a type of the battery, and a battery remaining amount (battery charge level).

The power supply control unit 313 also controls the DC-DC converter based on the detection result and an instruction from the system control unit 307 and supplies a necessary voltage to the storage medium 330 and the other units for a necessary period.

A power supply unit 314 includes a primary battery, such as an alkaline battery and a lithium (Li) battery, a secondary battery, such as a nickel-cadmium (NiCd) battery, a nickel-metal hydride (NiMH) battery, and a Li battery, and an alternate current (AC) adapter.

A storage medium interface (I/F) 315 is an interface with the storage medium 330 such as a memory card and a hard disk.

The storage medium 330 is a storage medium such as a memory card for storing a captured image and includes a semiconductor memory, an optical disk, and a magnetic disk.

A communication unit 316 is connected wirelessly or by a wired cable and transmits and receives a video signal, an audio signal, and the like.

The communication unit 316 can be connected to a wireless local area network (LAN) and the Internet.

The communication unit 316 can transmit an image (including a through-the-lens image) captured by the image capturing element 302 and an image stored in the storage medium 330 and receive image data and other various types of information from an external apparatus.

Vibration Detection Unit 320/Gyro Sensor

A vibration detection unit 320 is, for example, a gyro sensor and detects a vibration amount of the camera 100.

The vibration detection unit 320 detects a vibration and a vibration amount in three axial directions, which are a pitch direction, a yaw direction and a roll direction, of the camera 100.

In the camera 100 illustrated in FIG. 1, an image capturing element drive unit 303 performs optical vibration correction by controlling a movement of the image capturing element 302 based on the vibration amount detected by the vibration detection unit 320.

In addition, the image processing unit 305 performs electronic vibration correction on the image based on the vibration amount detected by the vibration detection unit 320 under the control of the system control unit 307.

Exploded Perspective View of Camera 100

Figure 3:
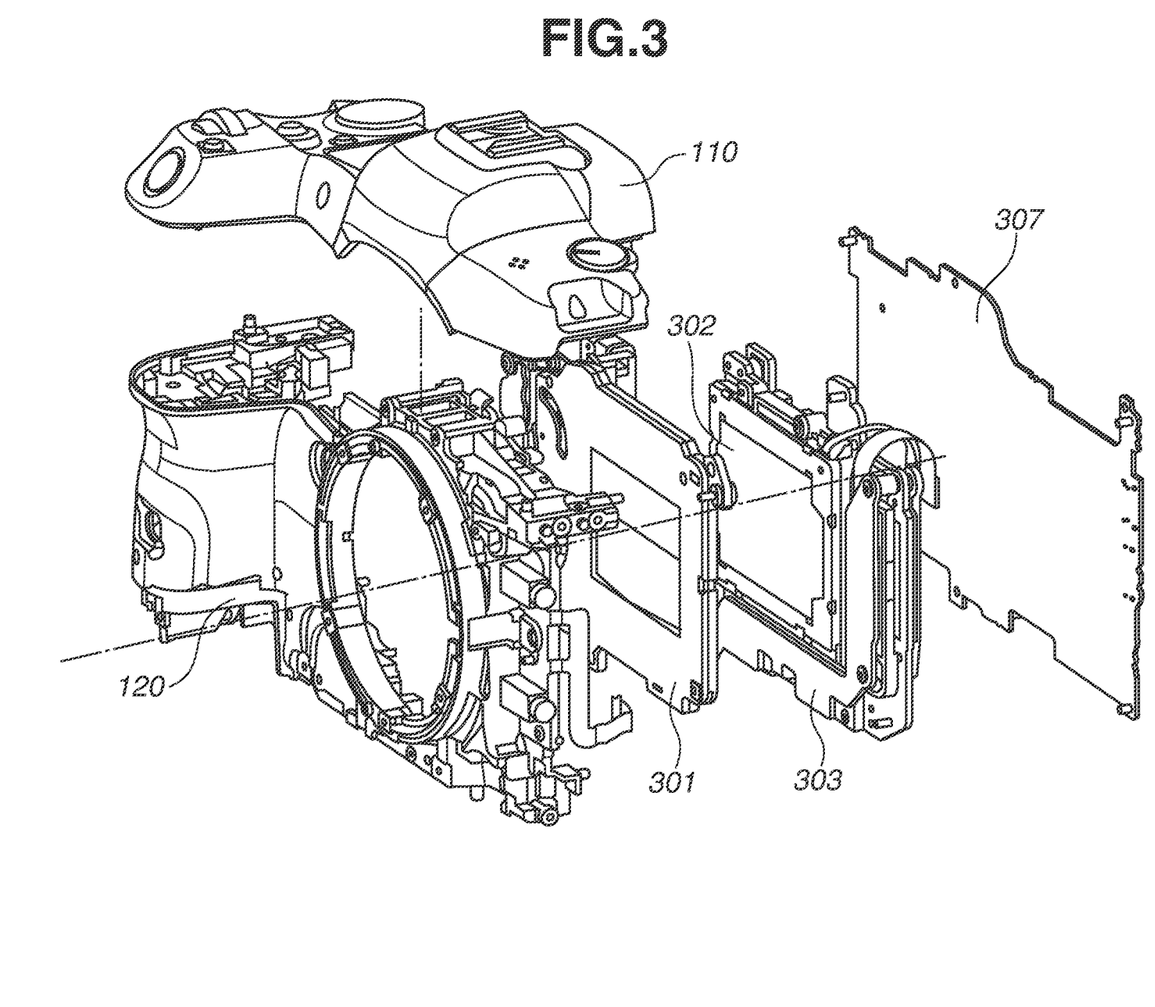
FIG. 3 is an exploded perspective view of the camera according to the first exemplary embodiment of the present disclosure.

FIG. 3 is an exploded perspective view of the camera 100 in which cover members on a front side, a rear side, and a lower side are removed.

A base plate 120 is a structure that assumes the role of providing strength to the camera 100, and the shutter 301, the image capturing element 302, the image capturing element drive unit 303, and the system control unit 307 are fastened to the base plate 120 with screws (not illustrated).

A top cover unit 110 is fastened to the base plate 120 with screws (not illustrated).

External Perspective View of Top Cover Unit 110

Figure 4A:
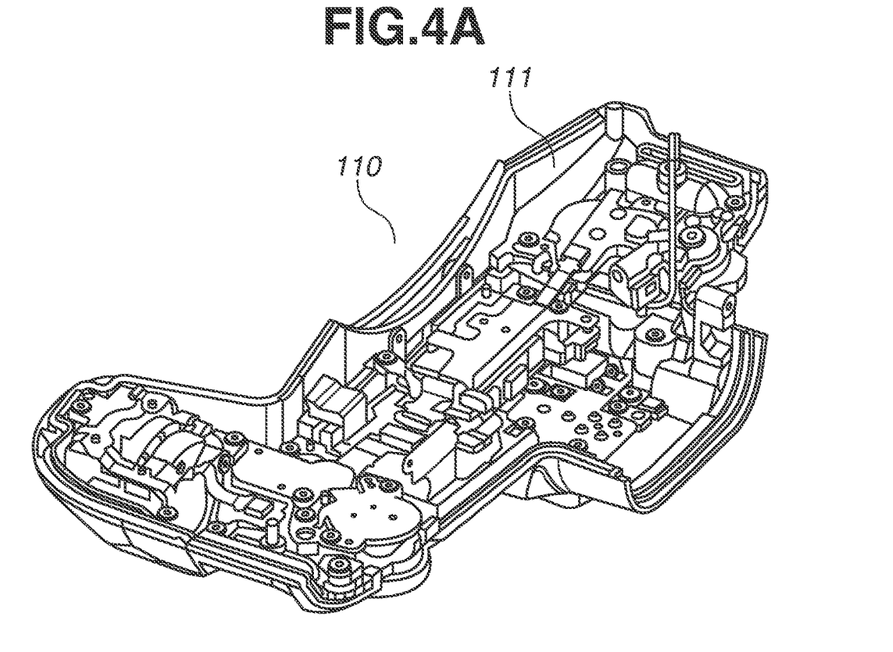
FIGS. 4A and 4B are perspective views illustrating an internal structure of a top cover unit according to the first exemplary embodiment of the present disclosure.
Figure 4B:
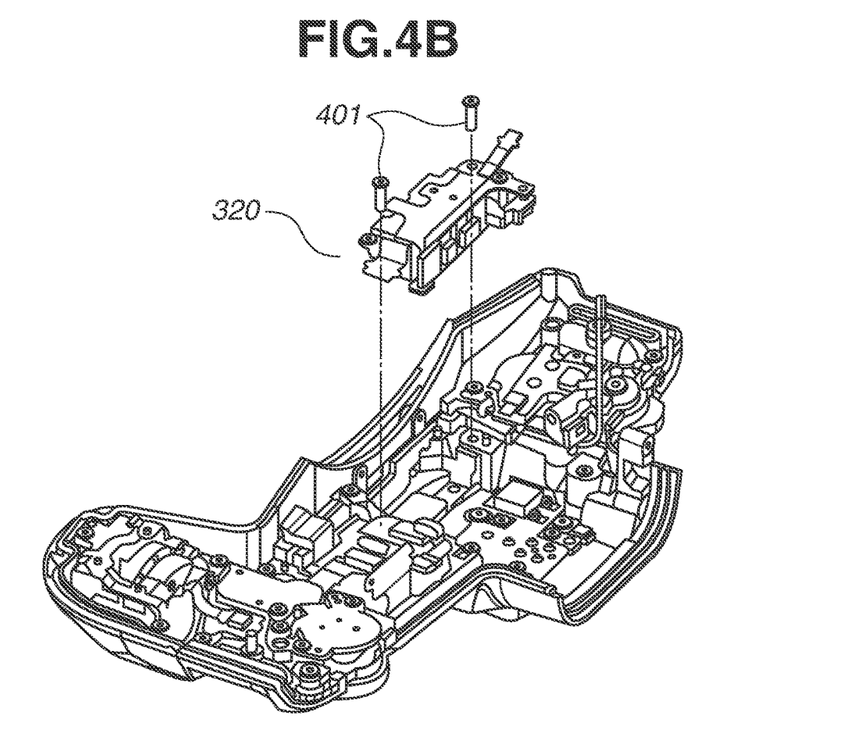

FIG. 4A is an external perspective view of the top cover unit 110, and FIG. 4B is an exploded perspective view of the top cover unit 110.

The top cover unit 110 includes a top cover member 111 that covers an upper surface of the camera 100, the power supply switch 103, and the shutter button 104.

As illustrated in FIG. 4B, the vibration detection unit 320 is fastened to a center portion of the top cover member 111 with screws 401.

Exploded Perspective View of Vibration Detection Unit 320

Figure 5A:
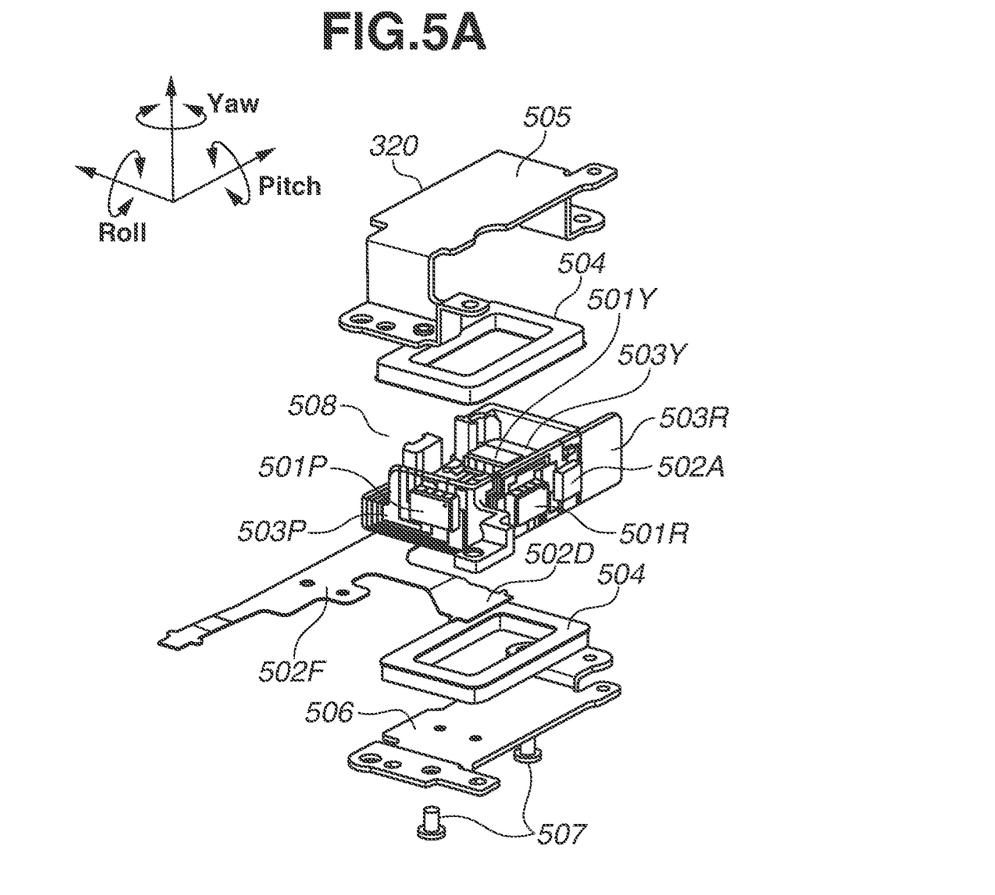
FIG. 5A is an exploded perspective view and FIGS. 5B and 5C are side views of a vibration detection unit according to the first exemplary embodiment of the present disclosure.
Figure 5B:
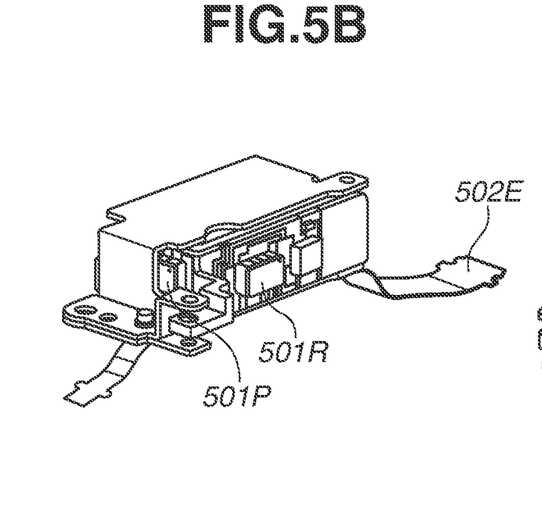
Figure 5C:
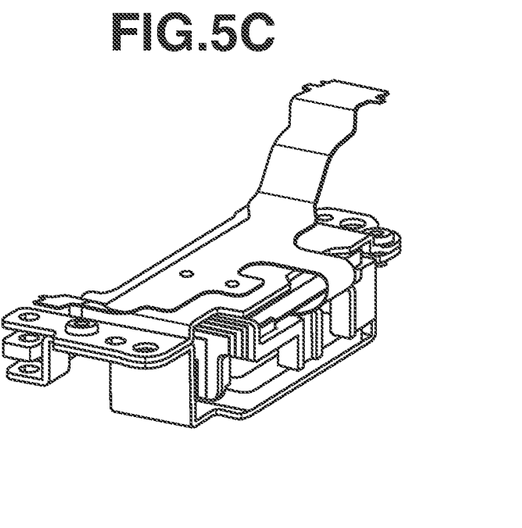

FIG. 5A is an exploded perspective view of the vibration detection unit 320, and FIGS. 5B and 5C are external perspective views of the vibration detection unit 320.

The vibration detection unit 320 includes plates 505 and 506, a buffer member 504, a sensor module 508, and a flexible board 502F.

The sensor module 508 includes gyro sensors 501P, 501R, and 501Y (also referred to as a second sensor 501P, a third sensor 501R, and a first sensor 501Y) that each detect an angular velocity and an acceleration sensor 502A that detects an acceleration rate.

The sensor module 508 further includes passive elements 502R (see FIG. 6B) such as a resistor and a capacitor for driving the three gyro sensors 501P, 501R, and 501Y and the acceleration sensor 502A.

The flexible board 502F includes terminal portions 502D and 502E.

The terminal portion 502D is connected to a connector 502C (see FIGS. 6B and 6C) included in the sensor module 508.

The terminal portion 502E is electrically connected to a connector (not illustrated) that forms a part of a path to the system control unit 307.

Accordingly, the sensor module 508 and the system control unit 307 can perform various types of communication via the flexible board 502F.

Through the communication, the system control unit 307 can acquire detection values detected by the gyro sensors 501P, 501R, and 501Y, and the acceleration sensor 502A.

The buffer member 504 is made of an elastic member such as a sponge that absorbs a vibration.

The vibration detection unit 320 includes two buffer members 504.

The two buffer members 504 are arranged on different surfaces facing the sensor module 508 so that the sensor module 508 is located therebetween.

According to the present exemplary embodiment, the two buffer members 504 are each arranged on respective planes substantially parallel to a principal surface 503Y on which the gyro sensor 501Y is arranged.

The plates 505 and 506 include respective surfaces substantially parallel to the principal surface 503Y, and the sensor module 508 and the buffer members 504 are located therebetween.

One of the buffer members 504 is compressed between the plate 505 and the sensor module 508, and the other buffer member 504 is compressed between the plate 506 and the sensor module 508.

In other words, the plates 505 and 506 are configured not to be in contact with the sensor module 508.

The plates 505 and 506 are fastened with screws 507, and thus the vibration detection unit 320 is completed.

External Perspective View of Sensor Module 508

Figure 6A:
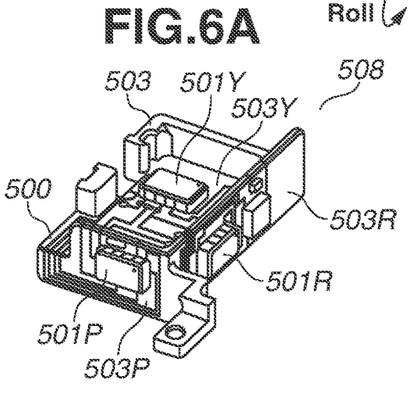
FIGS. 6A to 6F are external perspective views and a cross-sectional view of a main part of a sensor module, a plan view of a land shape, a cross-sectional perspective view of a via portion, and an enlarged cross-sectional view of the via portion according to the first exemplary embodiment of the present disclosure.
Figure 6B:
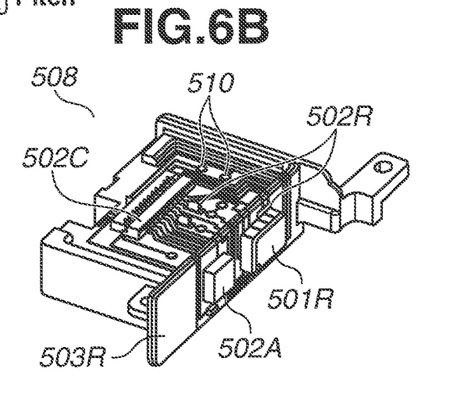
Figure 6C:
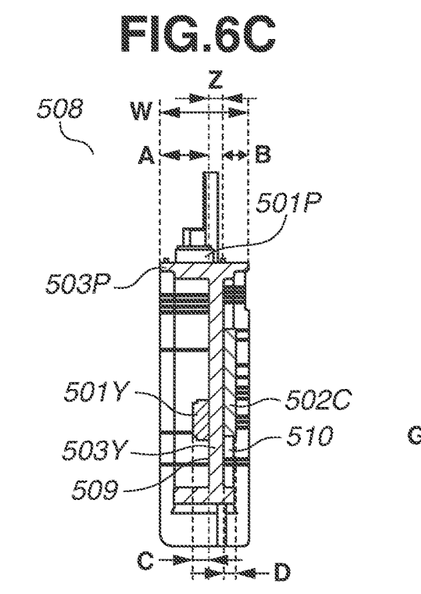

FIGS. 6A and 6B are external perspective views of the sensor module 508, and FIG. 6C is a cross-sectional view of a main part of the sensor module 508.

Figure 6D:
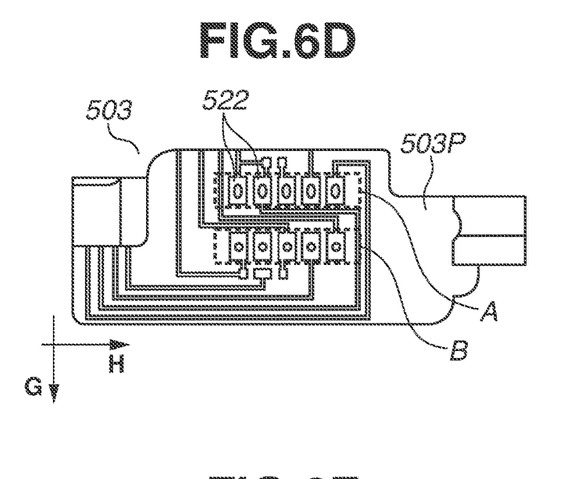

A base member 503 illustrated in FIG. 6D is a member for holding the gyro sensors 501P, 501R, and 501Y in predetermined positions and is formed of a material such as plastic and a liquid crystal polymer (LCP).

The base member 503 includes a first side wall 503P substantially orthogonal to a rotation axis in the pitch direction, a second side wall 503R substantially orthogonal to a rotation axis in the roll direction, and the principal surface 503Y substantially orthogonal to a rotation axis in the yaw direction.

In other words, the first side wall 503P is orthogonal to the principal surface 503Y, and the second side wall 503R is orthogonal to both of the principal surface 503Y and the first side wall 503P.

The gyro sensors 501P, 501R, and 501Y are mounted on the first side wall 503P, the second side wall 503R, and the principal surface 503Y, respectively.

The gyro sensors 501P, 501R, and 501Y are mounted on respective land portions of pattern wiring 500 on the base member 503 by direct soldering.

The sensor module 508 is configured as described above.

The gyro sensors 501P, 501R, and 501Y thus detect vibrations and vibration amounts in the pitch direction, the roll direction, and the yaw direction of the camera 100, respectively.

The connector 502C is mounted on a surface opposite to a surface of the principal surface 503Y on which the gyro sensor 501Y is mounted.

The surface of the principal surface 503Y on which the gyro sensor 501Y is mounted is referred to as a first surface 509, and the surface of the principal surface 503Y on which the connector 502C is mounted is referred to as a second surface 510.

The acceleration sensor 502A is mounted on the second side wall 503R.

As illustrated in FIGS. 6A and 6B, the pattern wiring 500 is directly formed on the base member 503.

The pattern wiring 500 is formed using the MID technology.

The MID technology is a technique for forming a pattern on a base member by irradiating a predetermined portion of the base member with a laser and applying metal plating only to the laser irradiated portion.

The gyro sensors 501P, 501R, and 501Y that detect vibrations, the acceleration sensor 502A, and various passive elements 502R for driving these sensors are described below.

The gyro sensors 501P, 501R, and 501Y, the acceleration sensor 502A, and the passive elements 502R are mounted on and directly soldered to respective mounting land portions provided by the pattern wiring 500 on the base member 503.

Further, the gyro sensors 501P, 501R, and 501Y, the acceleration sensor 502A, the passive elements 502R, and the connector 502C can be electrically connected to each other by the pattern wiring 500.

FIG. 6C is the cross-sectional view of the main part of the sensor module 508.

In a case where it is assumed that the principal surface 503Y has a thickness Z, and a shorter one of a length of the first side wall 503P and a length of the second side wall 503R in a direction orthogonal to the principal surface 503Y is a length W, the length W is larger than the thickness Z.

In addition, it is assumed that a higher one of the first side wall 503P and the second side wall 503R from the first surface 509 is a height A, and a higher one of the first side wall 503P and the second side wall 503R from the second surface 510 is a height B.

Further, it is assumed that a height from the first surface 509 to a top surface of the gyro sensor 501Y is a height C, and a height from the second surface 510 to a top surface of the connector 502C is a height D.

At that time, there is a relationship that the height A is greater than or equal to the height C, and the height B is greater than or equal to the height D.

According to the present exemplary embodiment, the sensor module 508 has the configuration described above.

Accordingly, the gyro sensor 501Y and the connector 502C do not project beyond a higher one of the first side wall 503P and the second side wall 503R in a direction perpendicular to the principal surface 503Y.

A height of the sensor module 508 in the direction orthogonal to the principal surface 503Y thus can be reduced.

FIG. 6D is an enlarged view of lands 522 formed on the first side wall 503P for mounting the gyro sensor 501P.

The gyro sensor 501P is mounted on the first side wall 503P by reflow soldering.

In FIG. 6D, an arrow G indicates a gravitational direction in a case where cream solder is melted when the gyro sensor 501P is mounted on the first side wall 503P by reflow soldering.

An arrow H indicates a direction orthogonal to the gravity direction and parallel to the first side wall 503P.

Generally when a component is mounted on a flat board by reflow mounting, gravity always acts on the component in a direction vertical to the surface on which the component is mounted.

However, in a case of the vibration detection unit 320 according to the present exemplary embodiment, the gyro sensors 501P, 501R, and 501Y are mounted on three respective surfaces that are orthogonal to each other.

Thus, gravity acts on at least one of the gyro sensors 501P, 501R, and 501Y in a direction parallel to the surface on which the gyro sensor is mounted in the reflow mounting.

According to the present exemplary embodiment, the gyro sensor 501P is mounted on the first side wall 503P in a state in which gravity acts in the direction of the arrow G.

Thus, in a case where solder melts, the gyro sensor 501P may shift from a desired mounting position in the direction of the arrow G due to an effect of gravity in the direction of the arrow G.

Therefore, in a land row A and a land row B each including five lands, a solder application amount to the land row B in a lower side is made smaller than a solder application amount to the land row A in FIG. 6D.

As a result, surface tension of the solder applied to the land row A becomes larger than surface tension of the solder applied to the land row B.

Accordingly, a force acts on the gyro sensor 501P in a direction opposite to the arrow G due to the surface tension of the solder to offset the gravity acting on the gyro sensor 501P in the direction of the arrow G, so that the positional shift of the gyro sensor 501P due to the gravity can be prevented at the time of reflow mounting.

As illustrated in FIGS. 6A and 6B, the base member 503 is provided with a plurality of vias 510 for electrically connecting one side to the other side of the principal surface 503Y.

Figure 6E:
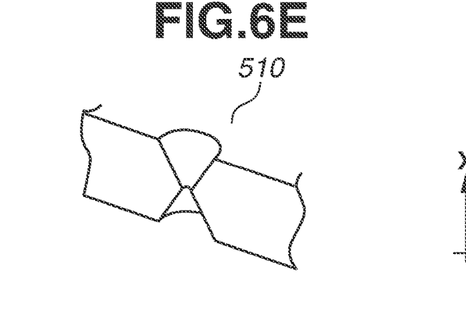
Figure 6F:
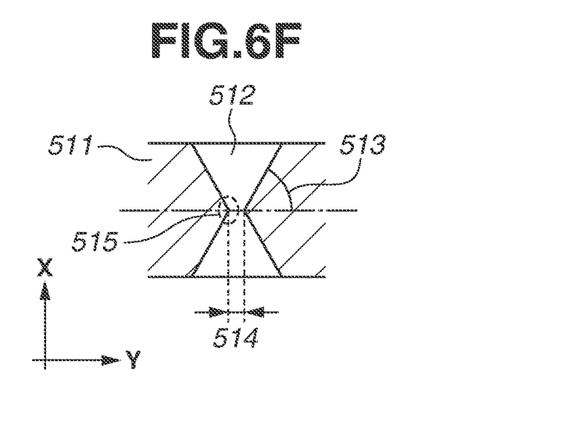

FIG. 6E is an enlarged cross-sectional perspective view of an arrangement portion of a via 510 in the base member 503, and FIG. 6F is an enlarged cross-sectional view of the arrangement portion of the via 510 in the base member 503.

Since the principal surface 503Y is a largest flat surface, the structure of a mold structure for forming the base member 503 is more productive if the mold is configured to be pulled out in the direction perpendicular to the principal surface 503Y.

According to the present exemplary embodiment, the vias 510 are arranged only on the principal surface 503Y such that a direction of holes 512 of the vias 510 matches the direction where the mold is pulled out, so that the mold structure can be simplified.

According to the present exemplary embodiment, as illustrated in FIGS. 6E and 6F, each via 510 is formed with the hole 512 having a shape in which two mortars are symmetrically stacked with respect to a center in a thickness direction of the principal surface 503Y.

The mortar has the smallest diameter at the center in the thickness direction of the principal surface 503Y, and the diameter increases as a distance from the center in the thickness direction increases.

If it is assumed that a diameter of a circle at a via apex 515 is a via diameter 514, the hole 512 opens with a certain via angle 513 starting from the via apex 51 to the surface of the base member 503, and the hole 512 penetrates a base member 511.

A pattern is directly wired by the MID on an inner wall of the hole 512 from the one side to the other side of the principal surface 503Y.

Thus, the respective patterns wired on the one side and on the other side of the base member 511 are electrically connected to each other via the via 510.

According to the present exemplary embodiment, the principal surface 503Y is provided with the hole 512 having the above-described shape instead of a simple cylindrical hole penetrating the principal surface 503Y in order to facilitate irradiating the inner wall of the hole 512 with a laser for forming a pattern.

Side View of Sensor Module 508

Figure 7A:
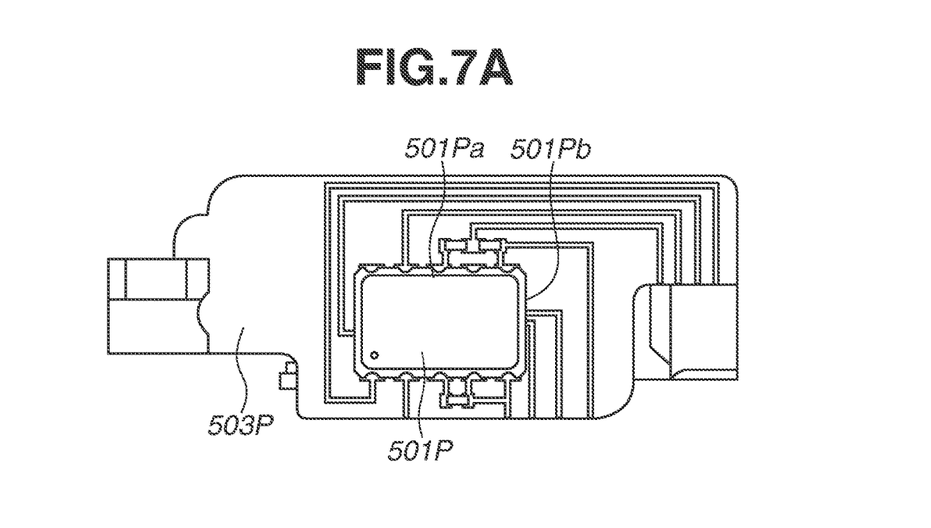
FIGS. 7A and 7B are side views of the sensor module according to the first exemplary embodiment of the present disclosure.
Figure 7B:
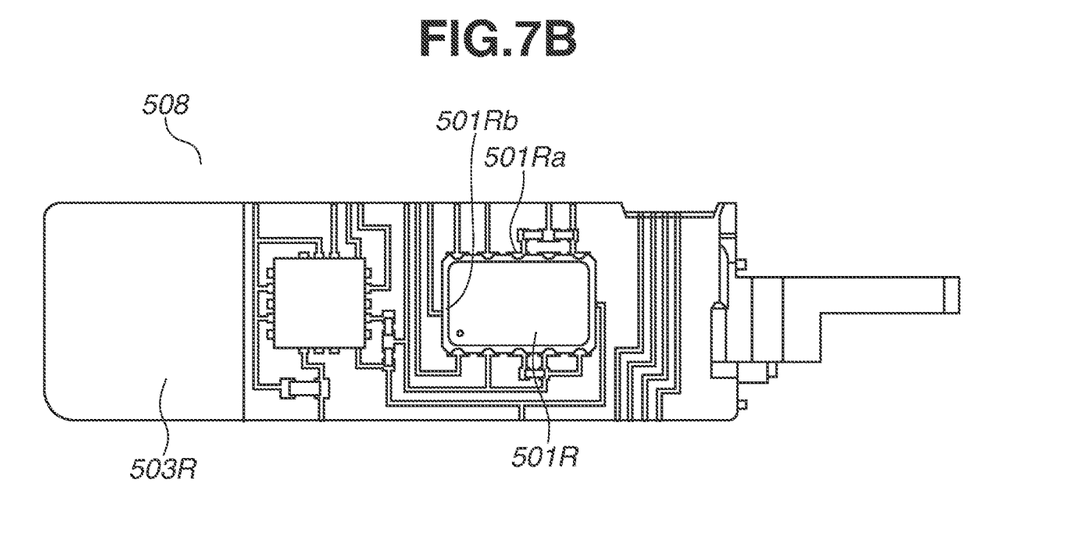

FIGS. 7A and 7B are side views of the sensor module 508. Specifically FIG. 7A illustrates the first side wall 503P and FIG. 7B illustrates the second side wall 503R.

The gyro sensors 501Y, 501R, and 501P according to the present exemplary embodiment are substantially rectangular when viewed from a direction perpendicular to the surface on which each of them is mounted.

The gyro sensor 501R has long sides 501Ra and short sides 501Rb, and the gyro sensor 501P has long sides 501Pa and short sides 501Pb.

According to the present exemplary embodiment, the gyro sensor 501R and the gyro sensor 501P are attached to the base member 503 so that the short sides 501Rb and the short sides 501Pb are parallel to the direction orthogonal to the principal surface 503Y.

Accordingly, the respective heights of the first side wall 503P and the second side wall 503R in the direction orthogonal to the principal surface 503Y can be reduced.

An outline of the present exemplary embodiment is described below.

The sensor module 508 includes the base member 503 and the sensors 501.

The base member 503 is an injection molded component in which the pattern wiring 500 is directly formed.

The base member 503 has at least the principal surface 503Y, the first side wall 503P orthogonal to the principal surface 503Y, and the second side wall 503R orthogonal to the principal surface 503Y and the first side wall 503P.

The principal surface 503Y is a surface having a largest area among the principal surface 503Y, the first side wall 503P, and the second side wall 503R.

The sensor 501 includes at least the first sensor 501Y, the second sensor 501P, and the third sensor 501R which detect respective physical quantities in three directions orthogonal to each other.

The pattern wiring 500 is electrically connected to each of the first sensor 501Y, the second sensor 501P, and the third sensor 501R.

The first sensor 501Y is mounted on lands formed by the pattern wiring 500 on the principal surface 503Y.

The second sensor 501P is mounted on lands formed by the pattern wiring 500 on the first side wall 503P.

The third sensor 501R is mounted on lands formed by the pattern wiring 500 on the second side wall 503R.

The length W, which is a larger one of the width of the first side wall 503P and the width of the second side wall 503R in the first direction Y perpendicular to the principal surface 503Y is larger than the thickness Z of the principal surface 503Y in the first direction Y.

Each of the second sensor 501P and the third sensor 501R is rectangular having short sides and long sides when respectively viewed from the pitch and roll directions, which are orthogonal to the respective surfaces on which the second sensor 501P and the third sensor 501R are mounted.

Each of the second sensor 501P and the third sensor 501R is mounted so that the short sides thereof are parallel to the direction orthogonal to the principal surface 503Y.

The sensor module 508 is electrically connected to another module via the connector 502C mounted on the principal surface 503Y.

The first sensor 501Y is mounted on one of the sides of the principal surface 503Y.

The height A is a larger one of a distance from the one side of the principal surface 503Y to an upper surface of the first side wall 503P on the one side in the first direction and a distance from the one side of the principal surface 503Y to an upper surface of the second side wall 503R on the one side in the first direction.

The height C is a distance from the one side of the principal surface 503Y to the upper surface of the first sensor 501Y in the first direction.

The height A is greater than or equal to the height C.

In other words, the height A has a value greater than or equal to that of the height C.

The vias 510 for electrically connecting the one side and the other side of the principal surface 503Y are formed on the principal surface 503Y of the base member 503.

No via 510 for electrically connecting the one side and the other side of the first side wall 503P is formed on the base member 503.

No via 510 for electrically connecting the one side and the other side of the second side wall 503R is formed on the base member 503.

The first sensor 501Y, the second sensor 501P, the third sensor 501R are gyro sensors.

The configuration of the base member 503 according to the present exemplary embodiment is not limited to the configuration in which three flat plates of the principal surface 503Y, the first side wall 503P, and the second side wall 503R are orthogonal to each other.

For example, the base member 503 may have the principal surface 503Y, the first side wall 503P which is not parallel to the principal surface 503Y, and the second side wall 503R which is not parallel to the principal surface 503Y and the first side wall 503P.

An angle formed by an inner wall of the first side wall 503P and the principal surface 503Y may be an obtuse angle (greater than 90 degrees).

An angle formed by an inner wall of the second side wall 503R and the principal surface 503Y may be an obtuse angle (greater than 90 degrees).

Next, a sensor module according to a second exemplary embodiment of the present disclosure is described with reference to FIGS. 8A to 8C.

Figure 8A:
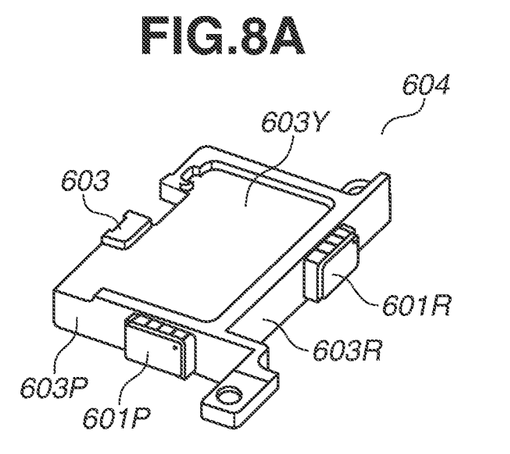
FIGS. 8A and 8B are external perspective views and FIG. 8C is a cross-sectional view of a main part of a sensor module according to a second exemplary embodiment of the present disclosure.
Figure 8B:
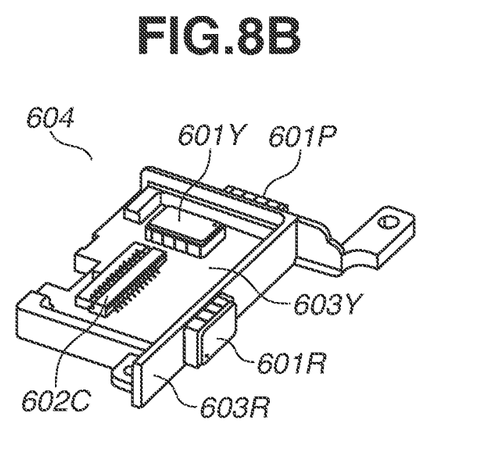
Figure 8C:
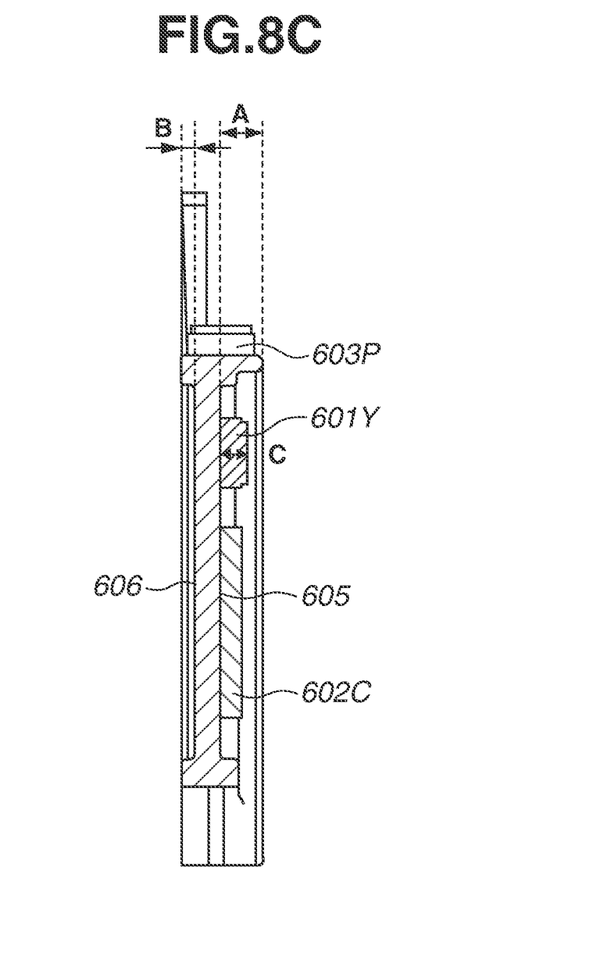

In FIGS. 8A to 8C, a pattern wiring and passive elements such as a resistance and a capacitor are omitted to simplify the drawings and facilitate understanding.

The first exemplary embodiment is described using an example in which electronic components are mounted on both sides of the principal surface 503Y. According to the present exemplary embodiment, an example is described in which electronic components are mounted only on one of the sides of a principal surface 603Y.

Since the first exemplary embodiment and the second exemplary embodiment differ from each other only in the sensor module, only a difference between the sensor module according to the second exemplary embodiment and the sensor module according to the first exemplary embodiment is described below.

Perspective View of Sensor Module 604

FIGS. 8A and 8B are perspective views of a sensor module 604 according to the second exemplary embodiment of the present disclosure, and FIG. 8C is a cross-sectional view of a main part of the sensor module 604.

The sensor module 604 includes a base member 603 and gyro sensors 601P, 601R, and 601Y which are respectively mounted on a first side wall 603P, a second side wall 603R, and the principal surface 603Y of the base member 603.

According to the first exemplary embodiment, the connector 502C is mounted on the second surface 510 opposite to the first surface 509 of the principal surface 503Y on which the gyro sensor 501Y is mounted.

In the second exemplary embodiment, a connector 602C is mounted on a first surface 605 on which a gyro sensor 601Y is mounted.

It is assumed that a height A is a higher one of a height of the first side wall 603P from the first surface 605 and a height of the second side wall 603R from the first surface 605.

It is assumed that a height B is a higher one of a height of the first side wall 603P from the second surface 606 and a height of the second side wall 603R from the second surface 606.

A height of a component having a largest height from the first surface 605 to a top surface of the component among all components mounted on the first surface 605, i.e., two components of the gyro sensor 601Y and the connector 602C according to the present exemplary embodiment, is assumed as a height C.

At that time, the height A is greater than or equal to the height C, and the height B is zero or more.

According to the present exemplary embodiment, the sensor module 604 is configured as described above.

Accordingly, the gyro sensor 601Y and the connector 602C do not project beyond the higher one of the first side wall 603P and the second side wall 603R in a direction perpendicular to the principal surface 603Y.

The height of the sensor module 604 in a direction orthogonal to the principal surface 603Y thus can be reduced.

An outline of the present exemplary embodiment is described below.

The first sensor 501Y is mounted on the one side of the principal surface 503Y, and the connector 502C is mounted on the other side opposite to the one side of the principal surface 503Y.

It is assumed that the height A is a larger one of a distance from the one side of the principal surface 503Y to an upper surface of the first side wall 503P on the one side in the first direction and a distance from the one side of the principal surface 503Y to an upper surface of the second side wall 503R on the one side in the first direction.

It is assumed that the height B is a larger one of a distance from the other side of the principal surface 503Y to the upper surface of the first side wall 503P on the other side in the first direction and a distance from the other side of the principal surface 503Y to the upper surface of the second side wall 503R on the other side in the first direction.

The height C is a distance from the one side of the principal surface 503Y to the top surface of a first sensor 601Y in the first direction Y.

A distance from the other side of the principal surface 503Y to the top of the connector 502C in the first direction Y is assumed as a distance D.

The distance A is greater than or equal to the distance C, and the distance B is greater than or equal to the distance D.

Next, a sensor module according to a third exemplary embodiment of the present disclosure is described with reference to FIGS. 9A to 9C.

Figure 9A:
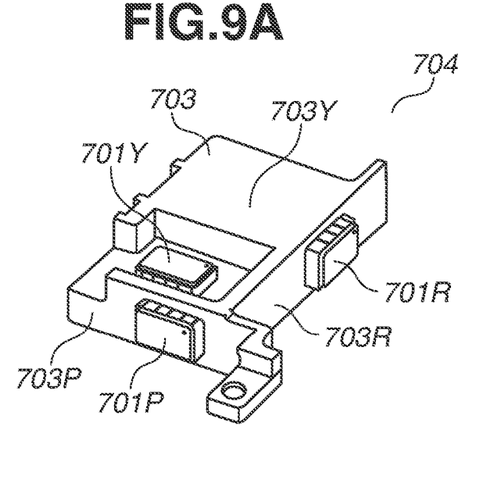
FIGS. 9A and 9B are external perspective views and FIG. 9C is a cross-sectional view of a main part of a sensor module according to a third exemplary embodiment of the present disclosure.
Figure 9B:
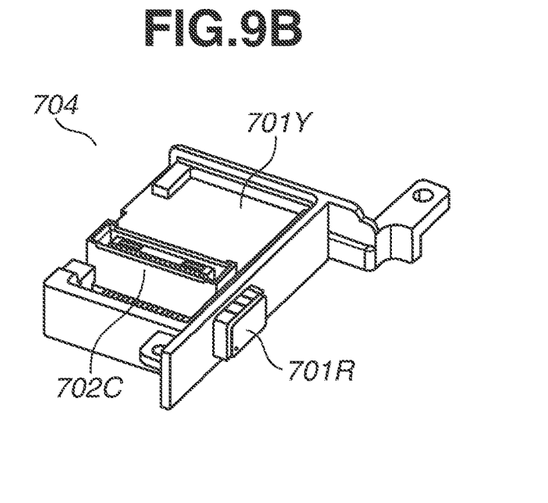
Figure 9C:
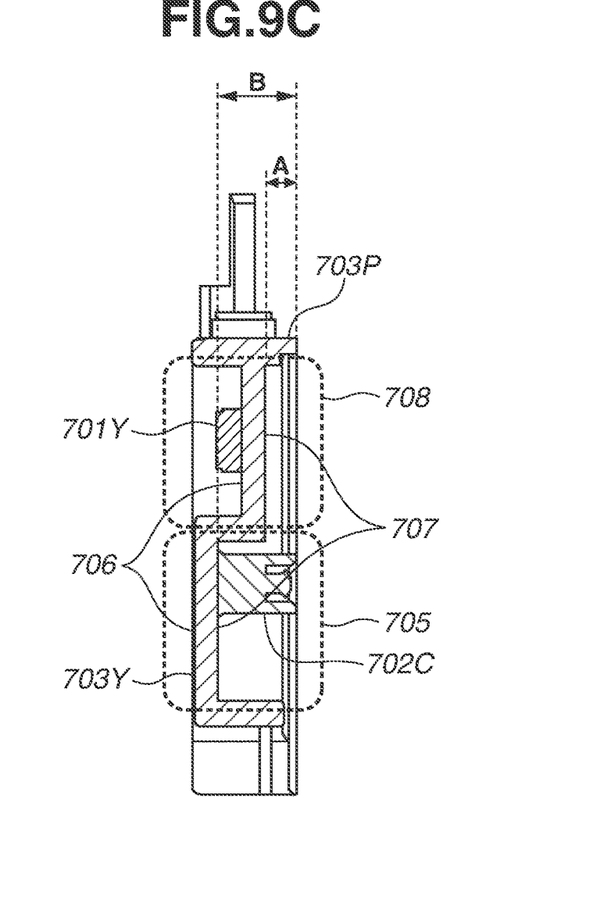

In FIGS. 9A to 9C, a pattern wiring and passive elements such as a resistance and a capacitor are omitted to simplify the drawings and facilitate understanding.

According to the first exemplary embodiment, the case is described in which the electronic components are mounted on both sides of the principal surface 503Y. According to the second exemplary embodiment, the case is described in which the electronic components are mounted on one of the sides of the principal surface 603Y.

According to the present exemplary embodiment, an example is described in which an electronic component having a large height in a direction orthogonal to a principal surface 703Y is mounted on a second surface 707 opposite to a first surface 706 of the principal surface 703Y on which a gyro sensor 701Y is mounted.

Since the first exemplary embodiment and the third exemplary embodiment differ from each other only in the sensor module, only a difference between the sensor module according to the third exemplary embodiment and the sensor module according to the first exemplary embodiment is described below.

FIGS. 9A and 9B are perspective views of a sensor module 704 according to the third exemplary embodiment of the present disclosure, and FIG. 9C is a cross-sectional view of a main part of the sensor module 704.

The sensor module 704 includes a base member 703 and gyro sensors 701P, 701R, and 701Y which are respectively mounted on a first side wall 703P, a second side wall 703R, and the principal surface 703Y of the base member 703. According to the first exemplary embodiment, the connector 502C is mounted on the second surface 510. According to the third exemplary embodiment, a connector 702C which has a larger height than the connector 502C is mounted on the second surface 707.

An area of the principal surface 703Y in which a component is mounted on the first surface 706 is referred to as a first area 708, and an area of the principal surface 703Y in which a component is mounted on the second surface 707 is referred to as a second area 705.

The principal surface 703Y has a shape in which respective positions of the first area 708 and the second area 705 are different in a direction perpendicular to the principal surface 703Y.

More specifically, a higher one of a height of the first side wall 703P and a height of the second side wall 703R from the second surface 707 in the first area 708 is assumed as a height A.

A higher one of a height of the first side wall 703P and a height of the second side wall 703R from the second surface 707 in the second area 705 is assumed as a height B. At this time, the height B is larger than the height A.

According to the present exemplary embodiment, the sensor module 704 is configured as described above.

Accordingly, the gyro sensor 701Y and the connector 702C do not project beyond the higher one of the first side wall 703P and the second side wall 703R in the direction perpendicular to the principal surface 703Y.

The height of the sensor module 704 in the direction orthogonal to the principal surface 703Y thus can be reduced.

An outline of the present exemplary embodiment is described below.

The first sensor 701Y and the connector are mounted on the one side of the principal surface 703Y.

It is assumed that the height A is a larger one of a distance from the one side to an upper surface of the first side wall 703P on the one side in the first direction and a distance from the one surface to an upper surface of the second side wall 703R on the one side in the first direction.

It is assumed that the height C is a larger one of a distance from the one side to an upper surface of the first sensor 701Y in the first direction Y and a distance from the one side to an upper surface of the connector in the first direction Y.

The distance A is greater than or equal to the distance C.

A fourth exemplary embodiment of the present disclosure is described with reference to FIGS. 10A to 10C.

Figure 10A:
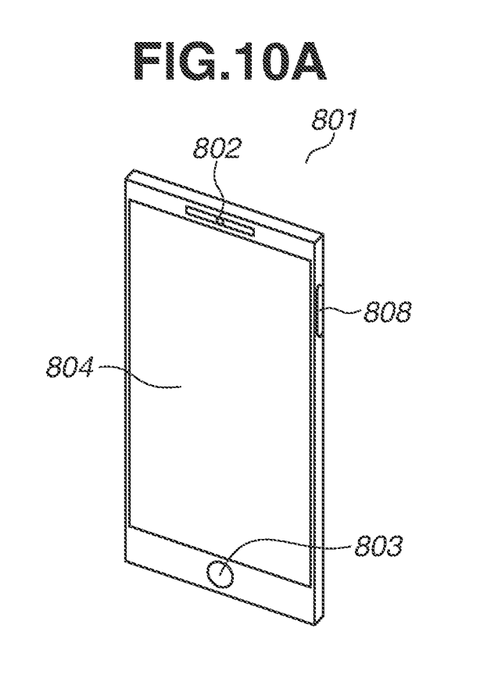
FIGS. 10A and 10B are external perspective views and FIG. 10C is an exploded perspective view of a smartphone according to a fourth exemplary embodiment of the present disclosure.
Figure 10B:
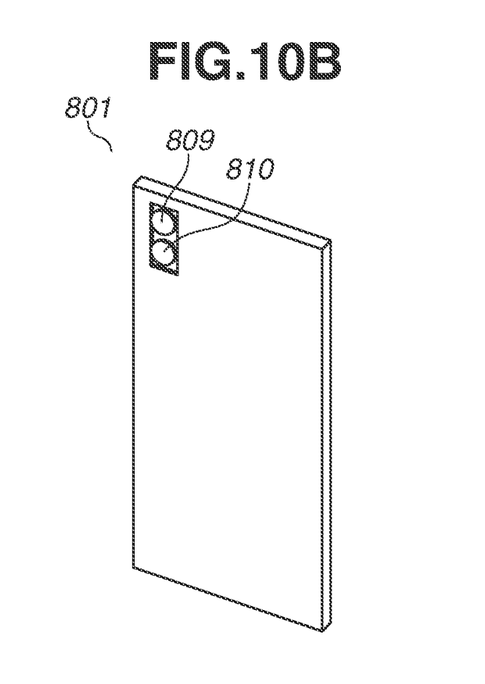
Figure 10C:
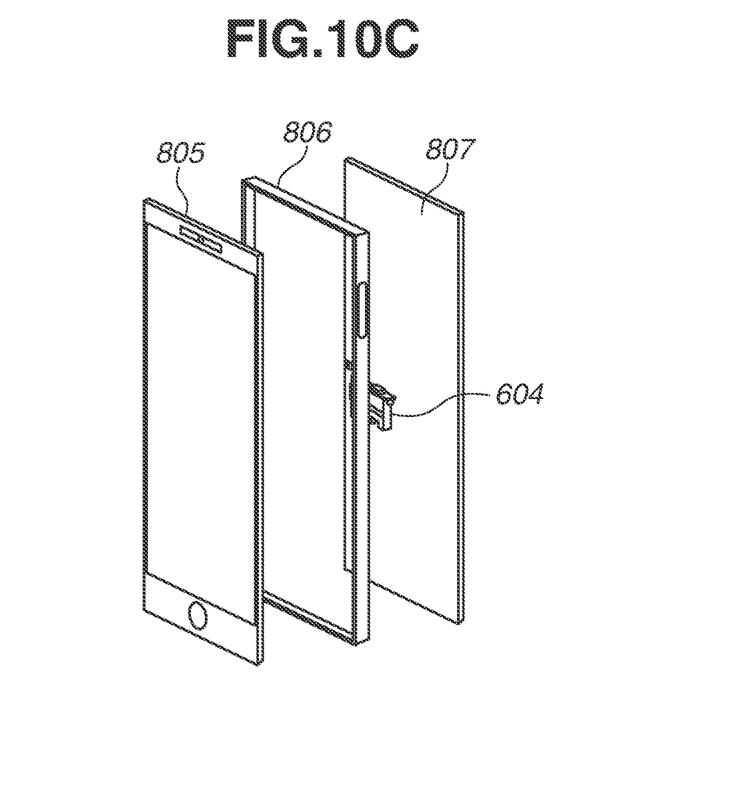

FIGS. 10A and 10B are external perspective views of a smartphone 801, and FIG. 10C is an exploded perspective view of the smartphone 801.

The smartphone 801 incorporates the sensor module 604 according to the second exemplary embodiment inside thereof.

In the exploded perspective view in FIG. 10C, internal components of the smartphone 801 other than the sensor module 604 are omitted to simplify the drawing and facilitate understanding.

An exterior of the smartphone 801 is made up of a front case 805, a frame 806, and a rear case 807.

The front case 805 includes a first image capturing device 802, a first operation unit 803, and a monitor 804. The frame 806 includes a second operation unit 808. The rear case 807 includes a second image capturing device 809 and a third image capturing device 810.

The sensor module 604 is incorporated inside the smartphone 801 while being supported by a support member (not illustrated) therein.

According to the present exemplary embodiment, the sensor module 604 is arranged so that the principal surface 603Y of the sensor module 604 is parallel to the front case 805.

A height of the sensor module 604 in the direction perpendicular to the principal surface 603Y is reduced, so that a thickness of the smartphone 801 in the direction orthogonal to the principal surface 603Y can be reduced.

Other Exemplary Embodiments

Although various exemplary embodiments of the present disclosure have been described above, the configuration of the present disclosure is not limited to those described in the above exemplary embodiments.

Materials, shapes, dimensions, forms, quantities, arrangement locations, and the like can be appropriately changed without departing from the gist of the present disclosure.

The exemplary embodiments of the present disclosure have been described using a camera and a smartphone as examples of an electronic device. The present disclosure, however, can be applied to various electronic devices such as a personal computer, a tablet terminal, a game device, a drone, an automobile, and peripheral devices thereof.

According to the present disclosure, a small sensor module which has a shape suitable for being housed in an electronic device can be provided.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-061119, filed Mar. 31, 2021, which is hereby incorporated by reference herein in its entirety.

What is claimed is:

1. A sensor module comprising:
a base member; and
a sensor,
wherein the base member is a molded component on which pattern wiring is directly formed,
wherein the base member includes at least a principal surface, a first side wall orthogonal to the principal surface, and a second side wall orthogonal to the principal surface and the first side wall,
wherein the principal surface is a surface having a largest area among the principal surface, the first side wall, and the second side wall,
wherein the sensor includes at least a first sensor, a second sensor, and a third sensor configured to detect respective physical quantities in three directions orthogonal to each other,
wherein the pattern wiring is electrically connected to each of the first sensor, the second sensor, and the third sensor,
wherein the first sensor is mounted on a land formed by the pattern wiring on the principal surface,
wherein the second sensor is mounted on a land formed by the pattern wiring on the first side wall,
wherein the third sensor is mounted on a land formed by the pattern wiring on the second side wall, and
wherein a larger one of a width of the first side wall and a width of the second side wall in a first direction perpendicular to the principal surface is larger than a width of the principal surface in the first direction.

2. The sensor module according to claim 1,
wherein the second sensor and the third sensor are rectangular having short sides and long sides when viewed from respective directions orthogonal to surfaces on which the second sensor and the third sensor are mounted, and
wherein the second sensor and the third sensor are mounted such that the short sides thereof are parallel to a direction orthogonal to the principal surface.

3. The sensor module according to claim 1, wherein the sensor module is electrically connected to another module via a connector mounted on the principal surface.

4. The sensor module according to claim 3,
wherein the first sensor is mounted on one side of the principal surface, and the connector is mounted on another side opposite to the one side of the principal surface, and
wherein, when a larger one of a distance from the one side to an upper surface of the first side wall on the one side in the first direction and a distance from the one side to an upper surface of the second side wall on the one side in the first direction is a distance A, a larger one of a distance from the another surface to an upper surface of the first side wall on the another side in the first direction and a distance from the another surface to an upper surface of the second side wall on the another side in the first direction is a distance B, a distance from the one side to an upper surface of the first sensor in the first direction is a distance C, and a distance from the another side to an upper surface of the connector in the first direction is a distance D, the distance A is greater than or equal to the distance C, and the distance B is greater than or equal to the distance D.

5. The sensor module according to claim 3,
wherein the first sensor and the connector are mounted on one side of the principal surface, and
wherein, when a larger one of a distance from the one side to an upper surface of the first side wall on the one side in the first direction and a distance from the one side to an upper surface of the second side wall on the one side in the first direction is a distance A, and a larger one of a distance from the one side to an upper surface of the first sensor in the first direction and a distance from the one side to an upper surface of the connector in the first direction is a distance C, the distance A is greater than or equal to the distance C.

6. The sensor module according to claim 1,
wherein the first sensor is mounted on one side of the principal surface, and
wherein a larger one of a distance from the one side to an upper surface of the first side wall on the one side in the first direction and a distance from the one side to an upper surface of the second side wall on the one side in the first direction is greater than or equal to a distance from the one side to an upper surface of the first sensor in the first direction.

7. The sensor module according to claim 1,
wherein the principle surface of the base member includes a via formed thereon for electrically connecting one side and another side of the principal surface,
wherein the base member does not include a via for electrically connecting one side and another side of the first side wall, and
wherein the bases member does not include a via for electrically connecting one side and another side of the second side wall.

8. The sensor module according to claim 1, wherein the first sensor, the second sensor, and the third sensor are gyro sensors.

9. An electronic device comprising:
a sensor module including:
a base member; and
a sensor,
wherein the base member is a molded component on which pattern wiring is directly formed,
wherein the base member includes at least a principal surface, a first side wall orthogonal to the principal surface, and a second side wall orthogonal to the principal surface and the first side wall,
wherein the principal surface is a surface having a largest area among the principal surface, the first side wall, and the second side wall,
wherein the sensor includes at least a first sensor, a second sensor, and a third sensor configured to detect respective physical quantities in three directions orthogonal to each other,
wherein the pattern wiring is electrically connected to each of the first sensor, the second sensor, and the third sensor,
wherein the first sensor is mounted on a land formed by the pattern wiring on the principal surface,
wherein the second sensor is mounted on a land formed by the pattern wiring on the first side wall,
wherein the third sensor is mounted on a land formed by the pattern wiring on the second side wall, and
wherein a larger one of a width of the first side wall and a width of the second side wall in a first direction perpendicular to the principal surface is larger than a width of the principal surface in the first direction.

10. A sensor module comprising:
a base member; and
a sensor,
wherein the base member is an injection molded component on which pattern wiring is directly formed,
wherein the base member includes at least a principal surface, a first side wall that is not parallel to the principal surface, and a second side wall that is not parallel to the principal surface and the first side wall,
wherein the principal surface is a surface having a largest area among the principal surface, the first side wall, and the second side wall,
wherein the sensor includes at least a first sensor, a second sensor, and a third sensor configured to detect respective physical quantities in three directions orthogonal to each other,
wherein the pattern wiring is electrically connected to each of the first sensor, the second sensor, and the third sensor,
wherein the first sensor is mounted on a land formed by the pattern wiring on the principal surface,
wherein the second sensor is mounted on a land formed by the pattern wiring on the first side wall,
wherein the third sensor is mounted on a land formed by the pattern wiring on the second side wall, and
wherein a larger one of a width of the first side wall and a width of the second side wall in a first direction perpendicular to the principal surface is larger than a width of the principal surface in the first direction.

* * * * *